US006590933B1

(12) United States Patent
Shusterman et al.

(10) Patent No.: US 6,590,933 B1
(45) Date of Patent: Jul. 8, 2003

(54) ADAPTIVE DECISION-FEEDBACK EQUALIZER WITH ERROR-PREDICTOR FOR IMPROVED CONVERGENCE

(75) Inventors: Eliahu Shusterman, Kfar-Saba (IL); Ehud Rokach, Tel-Aviv (IL); Lior Mishan, Holon (IL)

(73) Assignee: Tioga Technologies Ltd., Tel Aviv (IL)

( * ) Notice: Subject to any disclaimer, the term of this patent is extended or adjusted under 35 U.S.C. 154(b) by 0 days.

(21) Appl. No.: 09/472,109

(22) Filed: Dec. 27, 1999

(51) Int. Cl.[7] .............................. H03H 7/30; H03H 7/40; H03K 5/159
(52) U.S. Cl. ........................ 375/233; 375/232; 708/323
(58) Field of Search ................................ 375/232, 233, 375/234, 229, 350, 340; 708/322, 323; 333/28 R

(56) References Cited

U.S. PATENT DOCUMENTS

| 5,175,747 A | * | 12/1992 | Murakami ................... 375/232 |
| 5,293,402 A | * | 3/1994 | Crespo et al. ............... 375/233 |
| 5,513,216 A | | 4/1996 | Gadot et al. ................. 375/233 |
| 5,539,774 A | * | 7/1996 | Nobakht et al. ............. 375/232 |
| 5,604,769 A | | 2/1997 | Wang .......................... 375/229 |
| 5,777,692 A | * | 7/1998 | Ghosh ......................... 348/725 |
| 6,285,709 B1 | * | 9/2001 | Alelyunas et al. ........... 375/233 |

* cited by examiner

Primary Examiner—Phuong Phu
(74) Attorney, Agent, or Firm—Darby & Darby

(57) ABSTRACT

A method for use in data communications equipment for improving convergence of a hybrid decision feedback apparatus including an adaptive feed-forward equalizer and an adaptive decision feedback equalizer. An independent error predictor component is used for better convergence and then is eliminated by converting, using z-transformations, the adaptive feed forward equalizer and adaptive decision feedback equalizer to an equivalent feed forward equalizer and an equivalent decision feedback equalizer, respectively, in which the error predictor is embedded or incorporated therein. The smaller system with a reduced number of FFE-DFE coefficients has a faster convergence rate.

6 Claims, 4 Drawing Sheets

ADAPTIVE DECISION-FEEDBACK EQUALIZER WITH ERROR-PREDICTOR FOR IMPROVED CONVERGENCE

BACKGROUND OF THE INVENTION

1. Field of the Invention

The present invention relates to the field of communications. In digital communications each symbol transmitted over a time dispersive channel extends beyond the time interval used to represent that symbol. Distortion caused by the overlap of received symbols results in Inter-Symbol Interference (ISI), which may be reduced, by placing an equalizer in the path of the received signal. In particular, the invention relates to a method for changing the coefficients of an adaptive decision feedback equalizer, including its decision feedback and feed forward parts, to improve convergence.

2. Description of Related Art

The distortion caused by ISI may be reduced by passing the incoming signal through an adaptive decision feedback equalizer. Generally, the adaptation is performed according to some recursive method based on the minimization of means square error (MSE), for example, using a conventional least means square (LMS) or a recursive least squares (RLS) method. These conventional MSE based recursive adaptation equalizer methods exhibit convergence problems if the eigenvalues spread, e.g., the autocorrelation matrix condition number, representing a ratio between the largest to smallest eigenvalues, of the input signal is relatively large. Specifically, convergence speed depends on the spread of the eigenvalues of the input signal. Generally, the eigenvalue spread is relatively large due to the relatively high correlation of the input signal and depends on the length of the filter. A relatively large eigenvalue spread results in a relatively slow convergence requiring a very large number, for example, thousands or millions, of iterations that slowdown the adaptation process.

It is therefore desirable to develop a method that reduces the residual error and speeds up the convergence of any recursive mean square error based decision feedback equalizer using error prediction.

SUMMARY OF THE INVENTION

The present invention is directed to a method for use in data communications equipment for improving convergence of a hybrid decision feedback apparatus including an adaptive feed-forward equalizer and an adaptive decision feedback equalizer. An independent error predictor component is used for better convergence and then is eliminated by converting, using z-transformations, the adaptive feed forward equalizer and adaptive decision feedback equalizer to an equivalent feed forward equalizer and an equivalent decision feedback equalizer, respectively, in which the error predictor is embedded or incorporated therein. The smaller system with a reduced number of FFE-DFE coefficients has a faster convergence rate.

In one embodiment of the method for use in data communications equipment for improving convergence of a hybrid decision feedback apparatus in accordance with the present invention the adaptive feed-forward equalizer is transformed into an equivalent feed forward equalizer represented by a z-transformation $$FFE'(z)=FFE(z)[1-EP(Z^N)]$$

where, FFE'(z) is the equivalent feed-forward equalizer;

FFE(z) is an adaptive feed-forward equalizer;

$EP(Z^N)$ is an adaptive error predictor, wherein N is a sampling factor.

Similarly, the adaptive decision feedback equalizer is transformed into an equivalent decision feedback equalizer represented by a z-transformation $$DFE'(z)=EP(z)+DFE(z)[1-EP(z)]$$

where, DFE'(z) is the equivalent decision feedback equalizer;

DFE(z) is an adaptive decision feedback equalizer;

EP(Z) is the adaptive error predictor.

Another embodiment of the present invention is directed to a method for use in data communications equipment for improving convergence of a hybrid decision feedback apparatus, in which an initial tap length is set for each of the adaptive feed-forward equalizer and the adaptive decision feedback equalizer. During a first predetermined time period, the adaptive feed-forward equalizer and the adaptive decision feedback equalizer are adapted using a received distorted signal, until a desired error is obtained. An initial tap length is set for the error predictor. During a second predetermined time period, the adaptive feed-forward equalizer, the adaptive decision feedback equalizer, and the error predictor are simultaneously adapted using the received distorted signal. After that period, an equivalent feed-forward equalizer is determined using the z-transformation $$FFE'(z)=FFE(z)[1-EP(Z^N)]$$

where, FFE'(z) is the equivalent feed-forward equalizer;

FFE(z) is an adaptive feed-forward equalizer;

$EP(Z^N)$ is an adaptive error predictor, wherein N is a sampling factor.

Similarly an equivalent decision feedback equalizer is determined using the z-transformation $$DFE'(z)=EP(z)+DFE(z)[1-EP(z)]$$

where, DFE'(z) is the equivalent decision feedback equalizer;

DFE(z) is an adaptive decision feedback equalizer;

EP(Z) is the adaptive error predictor.

Still another embodiment in accordance with the invention relates to a method for use in data communications equipment for improving convergence of a hybrid decision feedback apparatus, in which an initial tap length is set for each of the adaptive feed-forward equalizer and the adaptive decision feedback equalizer. During a first predetermined time period, the adaptive feed-forward equalizer and the adaptive decision feedback equalizer are adapted using a received distorted signal, until a desired error is obtained. An initial tap length is set for an error predictor. During a second predetermined time period, the error predictor is adapted using the received distorted signal. After that period, an equivalent feed-forward equalizer is determined using the z-transformation $$FFE'(z)=FFE(z)[1-EP(Z^N)]$$

where, FFE'(z) is the equivalent feed-forward equalizer;

FFE(z) is an adaptive feed-forward equalizer;

$EP(Z^N)$ is an adaptive error predictor, wherein N is a sampling factor.

Similarly an equivalent decision feedback equalizer is determined using the z-transformation $$DFE'(z)=EP(z)+DFE(z)[1-EP(z)]$$

where, DFE'(z) is the equivalent decision feedback equalizer;

DFE(z) is an adaptive decision feedback equalizer;

EP(Z) is the adaptive error predictor.

The present invention is also directed to a hybrid decision feedback device for use with the methods described above. The device includes an equivalent feed-forward equalizer represented by a first z-transformation $$FFE'(z)=FFE(z)[1-EP(Z^N)]$$

where, FFE'(z) is the equivalent feed-forward equalizer;

FFE(z) is an adaptive feed-forward equalizer;

$EP(Z^N)$ is an adaptive error predictor, wherein N is a sampling factor.

The device also includes an equivalent decision feedback equalizer represented by a second z-transformation equation $$DFE'(z)=EP(z)+DFE(z)[1-EP(z)]$$

where, DFE'(z) is the equivalent decision feedback equalizer;

DFE(z) is an adaptive decision feedback equalizer;

EP(Z) is the adaptive error predictor.

BRIEF DESCRIPTION OF THE DRAWING

The foregoing and other features of the present invention will be more readily apparent from the following detailed description and drawings of illustrative embodiments of the invention wherein like reference numbers refer to similar elements throughout the several views and in which.

DETAILED DESCRIPTION OF THE PREFERRED EMBODIMENTS

Figure 1A:
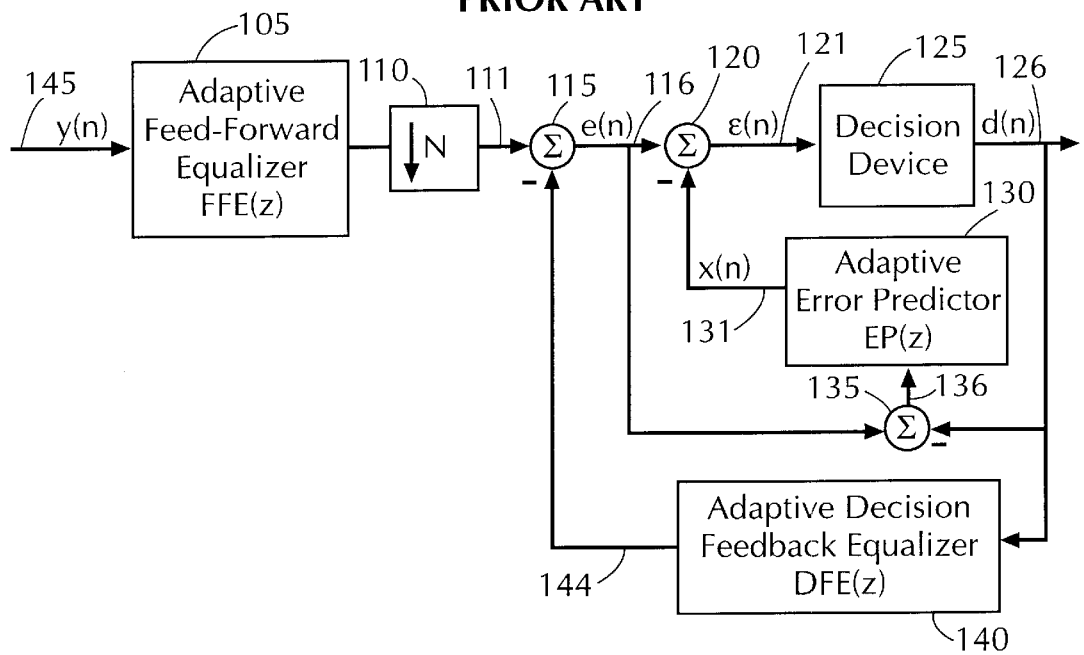
FIG. 1a is an example prior art block diagram of a hybrid decision feedback equalizer including a feed forward part, followed by a decision feedback part and an error predictor part in parallel.

Conventional hybrid type decision feedback equalizer structures including an adaptive feed forward equalizer followed by an intersymbol interference decision equalizer (ISI-DFE) and a noise predictive decision feedback equalizer (NP-DFE) in parallel are described, for example, in U.S. Pat. Nos. 5,513,216 and 5,604,769, the disclosure of which is each hereby expressly incorporated by reference as if fully set forth herein. FIG. 1a shows an example prior art hybrid DFE structure similar to the arrangement disclosed in these U.S. Patents. The hybrid DFE 100 includes an adaptive feed forward equalizer FFE(z) 105 the output of which is connected to a decimator 110 for sampling the signal by a factor N, where N≧1. Decimator 110 is only necessary when the adaptive feed forward equalizer 105 is a fractionally spaced equalizer. It is however, within the intended scope of the present invention, to use other equalizers as the adaptive feed forward equalizer 105, such as a symbol-spaced equalizer. A first adder 115 produces an output signal e(n) 116 representing the difference between the sampled output 11 of the decimator 110 and an output 141 of an adaptive decision feedback equalizer DFE(z) 140. A second adder 120 generates a signal $\epsilon$(n) 121 representing the difference between the received signal e(n) 116 and an output x(n) 131 of an adaptive error predictor EP(z) 130. The output signal $\epsilon$(n) 121 is transformed by a decision device 125 into the final output signal d(n) 126, which, in turn, is fed back to a third adder 135 and to the decision feedback equalizer 140. Adder 135 receives the output signal e(n) 116 of the first adder 115 and the output signal d(n) 126 of the decision device 125, and generates an output signal 136, representing the difference between the two input signals, that is fed to the adaptive error predictor EP(z) 130.

Conventional hybrid DFE structures that incorporate an EP scheme, such as that shown in FIG. 1a, have heretofore been used to track channel changes and noise, not to speed up convergence as in the present invention. Other distinguishing aspects and features will become apparent from a detailed explanation provided below of the method in accordance with the present invention for improving convergence of an adaptive decision feedback equalizer.

Figure 1B:
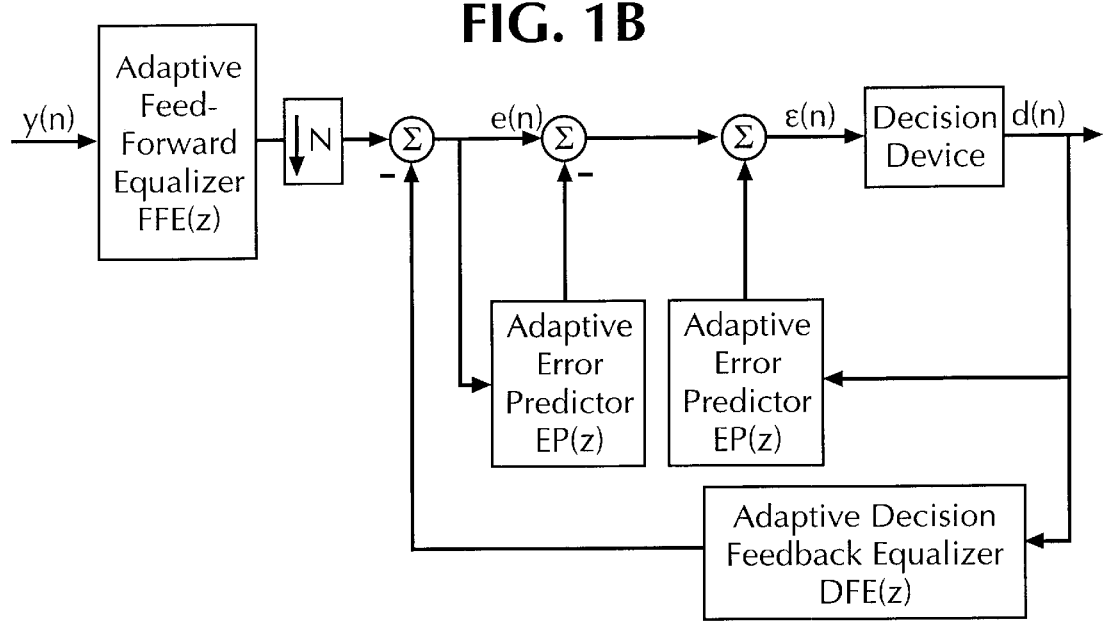
FIGS. 1b and 1c show the intermediate transformation stages of the system from that shown in FIG. 1a to the equivalent system shown in FIG. 1d.
Figure 1C:
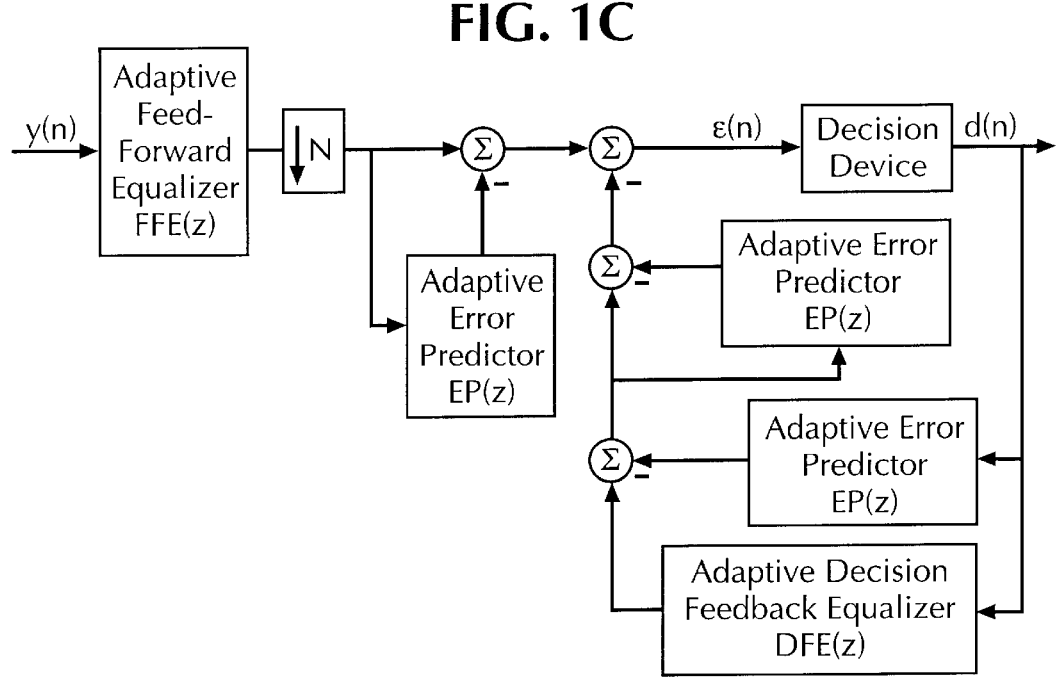
Figure 1D:
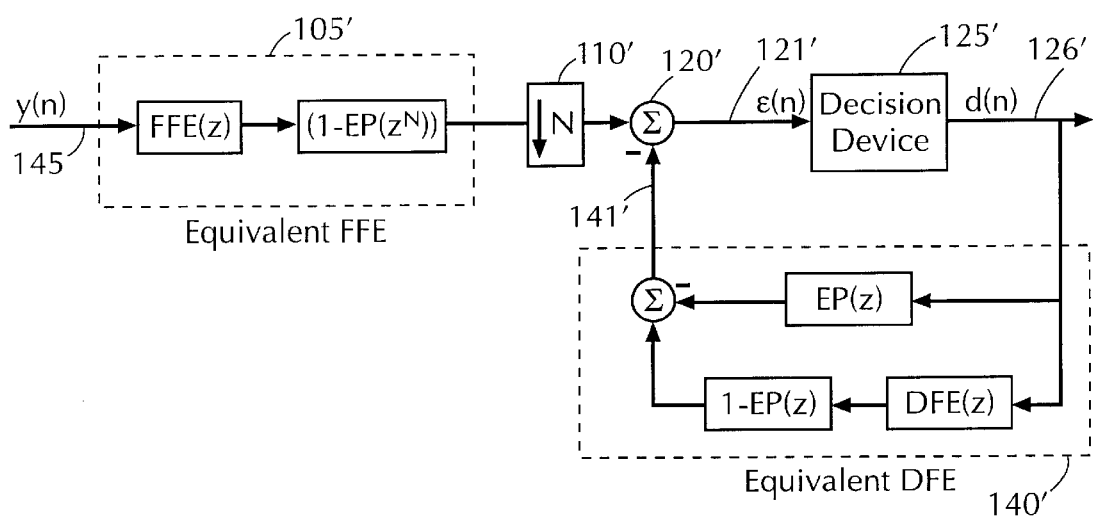
FIG. 1d shows an equivalent system of FIG. 1a without an error predictor part and exhibiting an improved speed of convergence.

Although the hybrid equalizer shown in FIG. 1a is useful to achieve a desired error, the arrangement is disadvantageous for a number of applications where relatively long DFE without EP is required. On the other hand, the convergence rate of such an arrangement, with a shorter DFE, is significantly improved. In accordance with the invention, once the optimum error is obtained, the hybrid equalizer arrangement may be improved by incorporating or embedding the adaptive error predictor into the feed forward and decision feedback equalizers. To achieve this result, the hybrid equalizer shown in FIG. 1a may be reduced or transformed to achieve an equivalent arrangement with the error predictor embedded or incorporated into the feed forward and decision feedback equalizers, as shown in FIG. 1d. FIGS. 1b and 1c show intermediate transformation steps between the arrangement shown in FIG. 1a and the equivalent structure in FIG. 1d. In FIG. 1d the adaptive feed forward equalizer FFE(z) 105 in FIG. 1a is transformed to an equivalent feed forward equalizer FFE'(z) 105' represented by the z-transformation equation $$FFE'(z)=FFE(z)[1-EP(Z^N)]$$

While the adaptive decision feedback equalizer DFE(z) 140 in FIG. 1a is transformed to an equivalent decision feedback equalizer DFE'(z) 140' represented by the z-transformation equation $$DFE'(z)=EP(z)+DFE(z)[1-EP(z)]$$

In the equivalent hybrid arrangement shown in FIG. 1d, the equivalent equalizers FFE'(z) 105' and DFE'(z) 140' are the same or longer in length than FFE(z) 105 and DFE(z) 140, respectively, in FIG. 1a, while the EP(z) 130 has been eliminated. FIGS. 1a through 1d confirm that the convergence rate can be improved by solving for an optimal error predictor and then lengthening the equalizers by embedding the obtained error predictor in the FFE and DFE. Obviously, the convergence rate of the smaller system with less DFE-FFE parameters and without the EP(z), has a faster convergence rate, but larger residual error.

Figure 2:
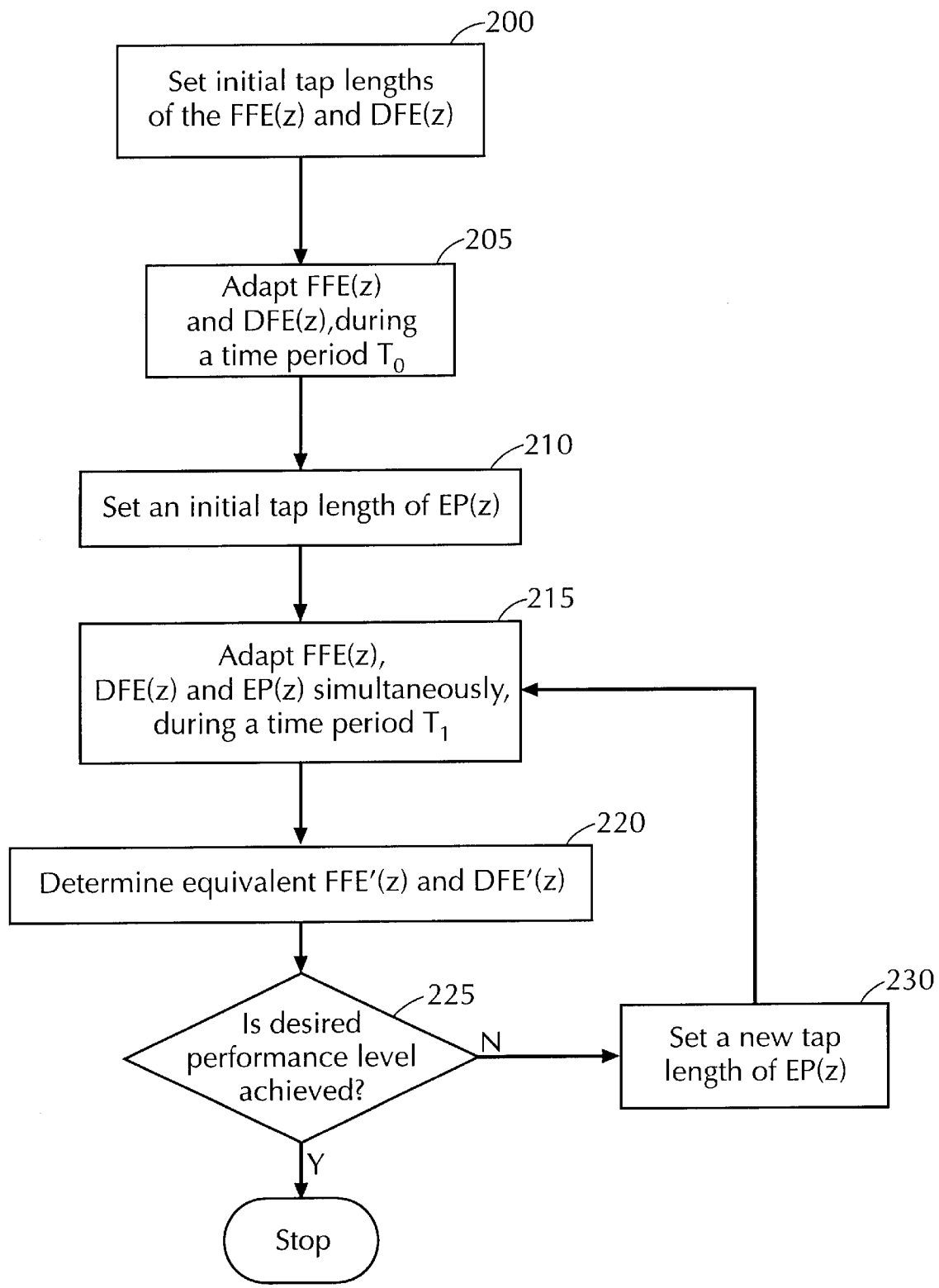
FIG. 2 is a flow chart of a method for improving the convergence rate of the hybrid decision feedback equalizer of FIG. 1, wherein the feed forward equalizer, the decision feedback equalizer and the error predictor are adapted during a second time period $T_1$.

FIG. 2 is a flow chart of the operation of the method for increasing the speed of convergence in a hybrid DFE structure, such as that shown in FIG. 1, in accordance with the present invention. In operation, a transmitted signal x is received as a distorted signal y(n) 145. In step 200, the tap lengths of the FFE(z) 105 and the DFE(z) 140 are set to $M_0$ and $L_0$ initial values, respectively. In step 205, during a first time period $T_0$ ($T_0 \geq 0$), FFE(z) 105 and DFE(z) 140 are adapted using the distorted signal y(n) 145. Thereafter, in step 210, the length of the tap of the EP(z) 130 is set to an initial predetermined value $K_0$. For a second time period $T_1(T_1 \geq 0)$, FFE(z) 105, DFE(z) 140, EP(z) 130 are adjusted simultaneously in step 215. In step 220 an equivalent feed forward equalizer FFE'(z) and equivalent decision feedback equalizer DFE'(z) of lengths $M_1$ and $L_1$, respectively, are determined using the z-transformation equations $$FFE'(z) = FFE(z)[1-EP(Z^N)]$$

$$DFE'(z) = EP(z) + DFE(z)[1-EP(z)]$$

In this equivalent scheme all values of EP'(z) are set to zero. The z-transformation equations incorporate or embed the influence of the EP(z) 130 to produce equivalent equalizers FFE'(z) 105' and DFE'(z) 140' of the same or longer in length than FFE(z) 105 and DFE(z) 140, respectively, and exhibit a faster convergence. In step 225 a determination is made whether a desired performance level has been achieved. If not, then a new tap length of EP(z) is set in step 230 and steps 215 through 220 are repeated until a desired performance level is achieved.

Prior to incorporation of the influence of the error predictor, the equalizers FFE(z) and DFE(z) have lengths, $M_0$ and $L_0$ respectively, while EP(z) has a length $K_0$. Accordingly, the matrix size for inversion is $(M_0+L_0) \times (M_0+L_0)$, and the matrix size of EP(z) is $K_0 \times K_0$. After the EP has been incorporated into the FFE and DFE, the equivalent length of FFE'(z) is $M_1 = M_0 + N^*K_0$, where the decimation factor $N \geq 1$, while the length of DFE'(z) is $L_1 = L_0 + K_0$. Therefore, the equivalent matrix size for inversion, without EP, is $(M_0+L_0+(N+1)K_0) \times (M_0+L_0+(N_0+1) K_0)$.

Figure 3:
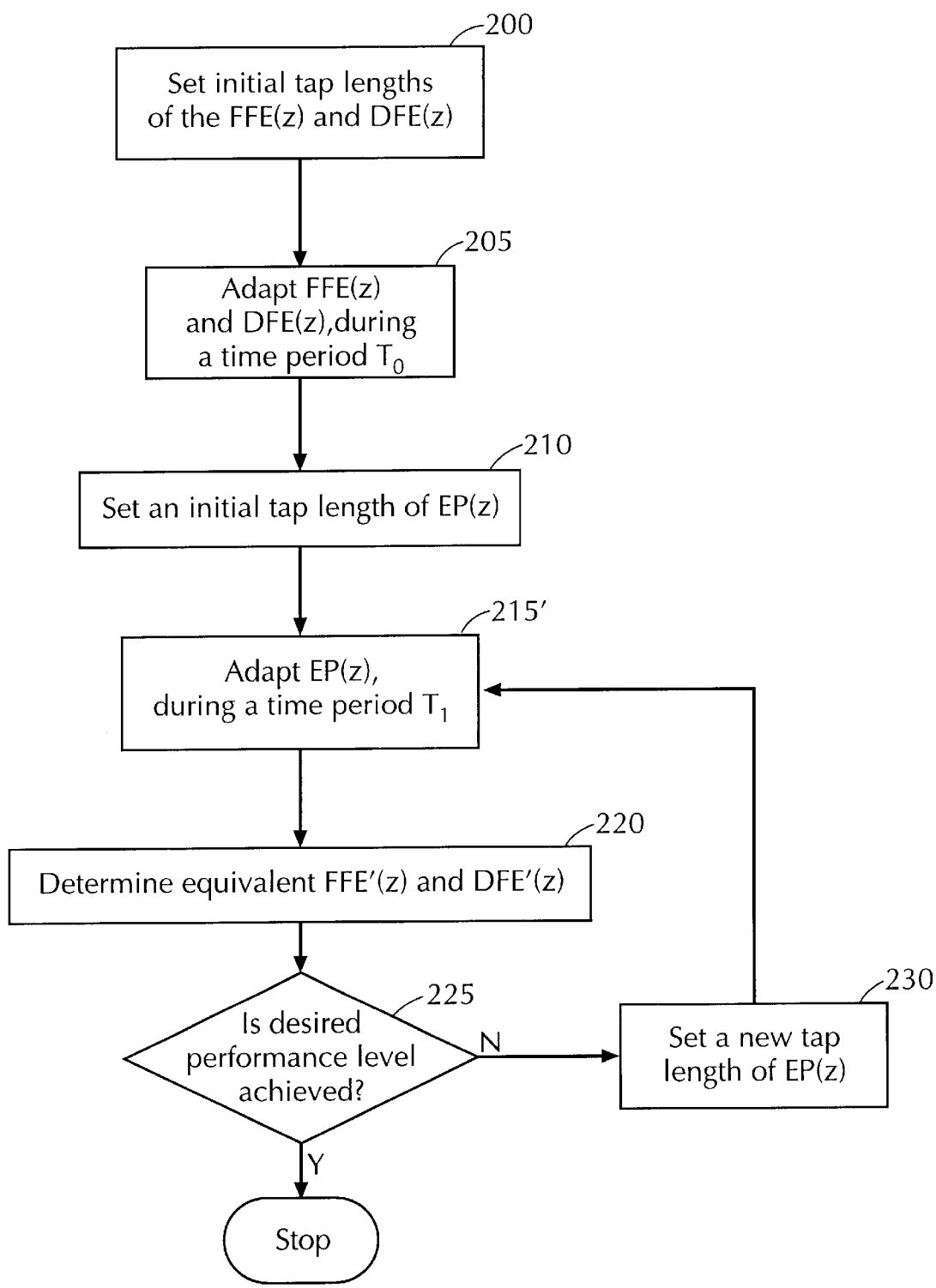
FIG. 3 is a flow chart of an alternative method for improving the convergence of the hybrid decision feedback equalizer of FIG. 1, wherein only the error predictor is adapted over the second time period $T_1$.

A flow chart of an alternative method in accordance with the present invention for improving the convergence of an adaptive decision feedback equalizer is shown in FIG. 3. The steps are numbered the same as those in the flow chart in FIG. 2, except step 215'. Step 215' differs from that of step 215 in FIG. 2 in that instead of the FFE, DFE and EP being adapted simultaneously over a time period $T_1$, only the EP is adapted using the distorted signal y(n) during the same time period $T_1$.

The method in accordance with the present invention for speeding up the convergence rate has a wide range of implementations in communication systems.

Thus, while there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

What is claimed is:

1. A method for use in data communications equipment for improving convergence of a hybrid decision feedback apparatus including an adaptive feed-forward equalizer and an adaptive decision feedback equalizer, said method comprising the steps of:

transforming the adaptive feed-forward equalizer into an equivalent feed forward equalizer represented by a z-transformation $$FFE'(z) = FFE(z)[1-EP(Z^N)]$$

where, FFE'(z) is the equivalent feed-forward equalizer;
   FFE(z) is an adaptive feed-forward equalizer;
   $EP(Z^N)$ is an adaptive error predictor, wherein N is a sampling factor; and transforming the adaptive decision feedback equalizer into an equivalent decision feedback equalizer represented by a z-transformation $$DFE'(z) = EP(z) + DFE(z)[1-EP(z)]$$

where, DFE'(z) is the equivalent decision feedback equalizer;
   DFE(z) is an adaptive decision feedback equalizer;
   EP(Z) is the adaptive error predictor.

2. A method for use in data communications equipment for improving convergence of a hybrid decision feedback apparatus including an adaptive feed-forward equalizer and an adaptive decision feedback equalizer, said method comprising the steps of:

(a) set an initial tap length for each of the adaptive feed-forward equalizer and the adaptive decision feedback equalizer;

(b) during a first predetermined time period, adapting the adaptive feed-forward equalizer and the adaptive decision feedback equalizer using a received distorted signal;

(c) set an initial tap length of an error predictor;

(d) during a second predetermined time period, simultaneously adapting the adaptive feed-forward equalizer, the adaptive decision feedback equalizer, and the error predictor using the received distorted signal;

(e) determine an equivalent feed-forward equalizer represented by a z-transformation $$FFE'(z) = FFE(z)[1-EP(Z^N)]$$

where, FFE'(z) is the equivalent feed-forward equalizer;
   FFE(z) is an adaptive feed-forward equalizer;
   $EP(Z^N)$ is an adaptive error predictor, wherein N is a sampling factor; and (f) determine an equivalent decision feedback equalizer represented by a z-transformation $$DFE'(z) = EP(z) + DFE(z)[1-EP(z)]$$

where, DFE'(z) is the equivalent decision feedback equalizer;

DFE(z) is an adaptive decision feedback equalizer;
EP(Z) is the adaptive error predictor.

3. A method in accordance with claim 2, further comprising the steps of:

setting a new tap length of the error predictor and repeating steps (d) and (e), until a desired performance level is achieved.

4. A method for use in data communications equipment for improving convergence of a hybrid decision feedback apparatus including an adaptive feed-forward equalizer and an adaptive decision feedback equalizer, said method comprising the steps of:

(a) set an initial tap length for each of the adaptive feed-forward equalizer and the adaptive decision feedback equalizer;

(b) during a first predetermined time period, adapting the adaptive feed-forward equalizer and the adaptive decision feedback equalizer using a received distorted signal;

(c) set an initial tap length of an error predictor;

(d) during a second predetermined time period, adapting the error predictor using the received distorted signal;

(e) determine an equivalent feed-forward equalizer represented by a z-transformation $$FFE'(z)=FFE(z)[1-EP(Z^N)]$$

where, FFE'(z) is the equivalent feed-forward equalizer;
FFE(z) is an adaptive feed-forward equalizer;
$EP(Z^N)$ is an adaptive error predictor, wherein N is a sampling factor; and (f) determine an equivalent decision feedback equalizer represented by a z-transformation $$DFE'(z)=EP(z)+DFE(z)[1-EP(z)]$$

where, DFE'(z) is the equivalent decision feedback equalizer;
DFE(z) is an adaptive decision feedback equalizer;
EP(Z) is the adaptive error predictor.

5. A method in accordance with claim 4, further comprising the steps of:

setting a new tap length of the error predictor and repeating steps (d) and (e), until a desired performance level is achieved.

6. A hybrid decision feedback device for use in data communications equipment, comprising:

an equivalent feed-forward equalizer represented by a first z-transformation $$FFE'(z)=FFE(z)[1-EP(Z^N)]$$

where, FFE'(z) is the equivalent feed-forward equalizer;
FFE(z) is an adaptive feed-forward equalizer;
$EP(Z^N)$ is an adaptive error predictor, wherein N is a sampling factor; and an equivalent decision feedback equalizer represented by a second z-transformation equation $$DFE'(z)=EP(z)+DFE(z)[1-EP(z)]$$

where, DFE'(z) is the equivalent decision feedback equalizer;
DFE(z) is an adaptive decision feedback equalizer;
EP(Z) is the adaptive error predictor.

* * * * *